May 19, 1964 L. F. B. AHLBERG ETAL 3,133,785

RECORD LOCATING APPARATUS

Filed March 21, 1961

INVENTORS
LARS F. B. AHLBERG
CARL A. R. LARSSON
BY
Mason, Kolehmainen
Rathburn + Wyss
Atty's.

United States Patent Office 3,133,785

Patented May 19, 1964

3,133,785
RECORD LOCATING APPARATUS

Lars F. B. Ahlberg, Storangen, and Carl A. R. Larsson, Stockholm, Sweden, assignors to Telefonaktiebolaget L M Ericsson, Stockholm, Sweden, a corporation of Sweden Filed Mar. 21, 1961, Ser. No. 97,347
Claims priority, application Sweden July 1, 1960
7 Claims. (Cl. 346—85)

This invention relates to a record locating means and, more particularly, to an apparatus controlled by deformations in a record element for locating the record element in desired positions.

In certain types of data handling apparatus, it is desirable to record data in punched or printed form on successive spaced portions of a record element. For example, time recorders generally include means by which each insertion of a time or record card into the recorder automatically causes successive time entries to be punched or printed on successive longitudinally spaced lines. In many of these units, a locating opening is punched in the marginal portion of the time card as each time entry is recorded so that the detection of this opening by sensing means when the card is next inserted into the recorder causes the card to be accurately located to receive the next time entry in a desired line spaced position.

One type of card locating means now commonly used in time recorders includes a biased sensing pin or finger that enters the first locating opening encountered during the insertion of the card. The movement of the sensing pin into the locating opening stops further card movement. In another type of locating device, the movement of the biased sensing pin into the opening in a direction perpendicular to the direction of movement of the card controls a connected linkage or mechanism to press the card against a parallel guide. This latter locating device avoids the transverse application of the card arresting force to the sensing pin.

However, these prior devices are subject to a number of deficiencies. Because of possible variations in the card or the transverse position thereof when the card is inserted into the recorder, it has generally been found to be necessary to use a locating hole of a relatively large diameter, such as three millimeters, in order to insure that the sensing pin and the opening are moved into alignment. Openings of this size possess a number of disadvantages. In the first place, the use of a series of large openings to control the card locating means reduces the area on the card available for data storage. Secondly, the use of locating openings on a record on which data is recorded by a punching operation sometimes results in erroneous data reproduction when the record is subsequently sensed in conventional data handling equipment.

Accordingly, one object of the present invention is to provide a new and improved record locating means.

Another object is to provide a record element locating means using new and improved means for detecting card positioning indicia.

A further object is to provide a card locating means having a means for sensing card positioning indicia that moves parallel to the direction of movement of the card.

Another object is to provide a card locating means in which movement of the card sensing means generally parallel to the direction of movement of the card operates means for arresting further movement of the card.

A further object is to provide a card locating means that can be used with record cards that do not require locating holes or openings.

In accordance with these and many other objects, an embodiment of the invention comprises a card or record element locating means controlled by a card or record deformation, such as a depression, a projection, or a small opening. The locating means includes a sensing element that is biased against one surface of a moving record element, such as a card being inserted into a time recorder. When the sensing element engages the card deformation used to control the positioning or locating of the card, the sensing means is moved by the card in a direction generally parallel to the card. This parallel movement of the sensing means actuates a card arresting lever or means on which the sensing means is mounted so that the card is pressed against a fixed structure, such as a portion of a card guideway. This movement of the card arresting means also actuates control or switching means to advise an associated data handling or recording unit that the record element is in position for a recording operation.

Many other objects and advantages of the present invention will become apparent from considering the following detailed description in conjunction with the drawings in which.

Figures 1, 2, 3:
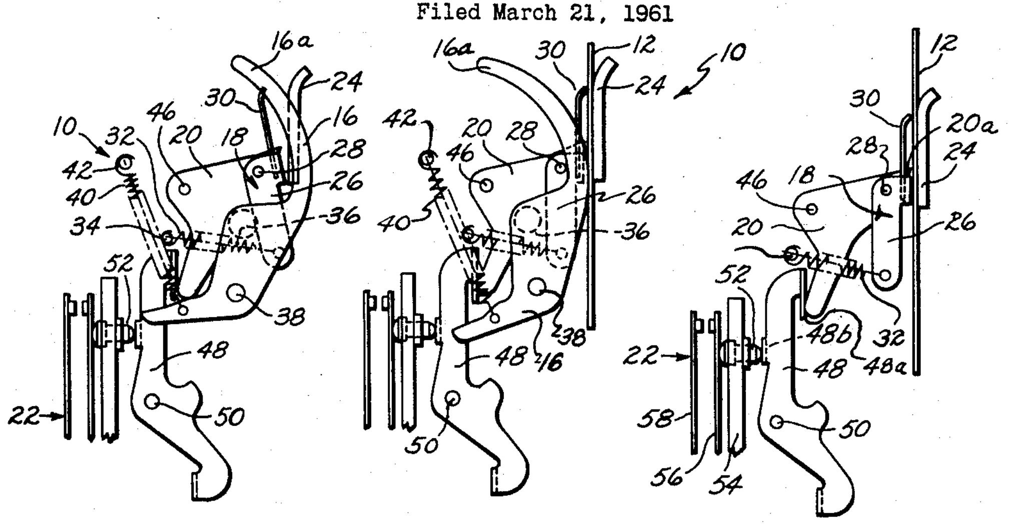
FIG. 1 is a side elevational view of a card locating means which embodies the present invention and which is shown in its normal position.
FIG. 2 is an elevational view similar to FIG. 1 illustrating the card locating means in a sensing position.
FIG. 3 is an elevational view similar to FIG. 2 with certain of the parts removed.
Figure 4:
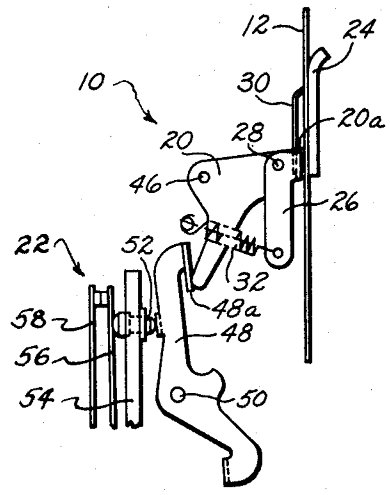
FIG. 4 is an elevational view similar to FIG. 3, but illustrating the card locating means in a card arresting position.
Figure 5:
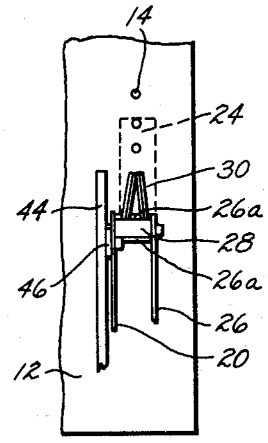
FIG. 5 is a rear elevational view of the card locating means shown in FIG. 4 with portions of the locating means removed.

Referring now more specifically to the drawings, therein is shown a card locating means, indicated generally as 10, which embodies the present invention and which is adapted for use with a record element or card 12 having one or more card locating deformations, such as projections, depressions, or holes, formed therein. The card locating means 10 forms a part of a unit of data handling equipment, such as a time recorder, that also includes suitable punching, printing or perforating means for recording time entries on the card 12. This time recorder includes suitable means for forming a deformation in the card 12 incident to each recording operation so that this deformation operates the card locating means 10 to arrest the card 12 in a proper position when it is next inserted into the time recorder. In FIGS. 1–5, the deformation formed in the card 12 comprises a punched hole or opening 14 disposed adjacent one edge thereof.

When the card 12 is inserted into the card locating means 10, a card detecting lever 16 is displaced to permit a card sensing means, indicated generally as 18, to move into engagement with one surface of the card 12. When the sensing means 18 engages the deformation formed in the card 12, this card moves the sensing means 18 in a direction generally parallel to the direction of movement of the card and actuates a card detent or arresting lever 20 to interrupt further movement of the card 12. When the lever 20 is actuated, a signaling assembly, indicated generally as 22, is actuated to provide a signal to the time recorder indicating that the record element 12 is in a proper position for the initiation of the recording operation. Because the sensing means 18 actuates the arresting lever 20 by a movement parallel to the card 12, the record element or card 12 does not require large locating holes or openings and avoids all of the deficiencies inherent in their use.

As indicated above, the card locating means 10 forms a portion of a larger unit of data handling equipment, such as a time recorder, and is mounted adjacent an entrance guideway or throat through which the record element 12 is inserted into the time recorder. In the drawings, a curved plate 24 rigidly mounted on the frame of the time recorder provides a portion of a guideway for removably receiving the record card 12 in a position interposed between the plate 24 and the remainder of the card locating means 10. Other portions of this card locating means are mounted on additional portions of the supporting frame of the time recorder which are not illustrated or which are shown in only fragmentary form.

The sensing means 18, which senses the moving record card 12 for the presence of a locating deformation and which is actuated thereby to move parallel to the record card 12, includes an arm 26 that is pivotally mounted on the lever 20 by a pivot pin 28. The arm 26 includes an offset portion 26*a* (FIG. 5) to which one or more flexible card sensing fingers or ribs 30 are secured at one end. In the normal condition of the card locating means 10, the offset ends of the flexible fingers 30 are maintained spaced from the plate 24. A tension spring 32 that is connected between one end of the arm 26 and a pin 34 secured to the frame biases an edge of the arm 26 into engagement with a stud 36 carried on the card sensing lever 16.

The card sensing lever 16 provides means for conditioning the card locating means 10 for operation in response to the insertion of the record card 12 into the time recorder unit. The lever 16 is pivotally mounted on the supporting frame by a pivot pin or shaft 38 and is normally held in the position shown in FIG. 1 by a tension spring 40 that is connected between one end of the lever 16 and a pin 42 that is carried on the supporting frame. When the card 12 is inserted into the recorder and passes over the upper surface of the plate 24, an arcuate portion 16*a* of the lever 16 is engaged by the leading edge of the card, and the lever 16 is pivoted about the pin 38 in a counterclockwise direction against the action of the spring 40 to the position shown in FIG. 2 of the drawings. In this position, the stud 36 moves away from the engaged edge of the arm 26 so that the spring 32 pivots this arm around the pivot pin 28 in a clockwise direction to place the offset ends of the flexible feeler arm or arms 30 in engagement with the adjacent surface of the record card 12. The sensing means 18 is now conditioned to detect a locating deformation in the record element.

As indicated above, the card arresting lever 20 is operated by movement of the sensing means 18 in a direction parallel to the moving card 12 to move into engagement with this card and arrest its further movement. The lever 20 is pivotally mounted on a portion 44 (FIG. 5) of the supporting frame by a pivot pin or shaft 46 and normally occupies the position shown in FIGS. 1–3. However, when the offset ends of the sensing elements or feelers 30 drop into one of the holes 14 formed in the record card 12, the continuing movement of this card produces downwardly directed and substantially rectilinear movement of the arm 26 and the feelers 30 from the position shown in FIG. 3 to the position shown in FIG. 4. This downward movement of the sensing means 18 pivots the lever 20 in a clockwise direction about the pivot pin 46 so that an angular end portion 20*a* on the lever 20 engages the record card 12 at a position spaced from the engaged opening 14. The lever 20 clamps or presses the card 12 against the plate 24 and arrests further movement of this card. Thus, the engagement of the deformation, i.e., the hole 14, by the flexible feeler 30 and the consequent parallel movement of the sensing means 18 actuates the lever 20 to engage and arrest movement of the card 12.

The signaling assembly 22 is provided for supplying an indication that the card 12 has been arrested in a proper position for printing, and this assembly also includes means for normally biasing the card engaging lever 20 to its normal position. The signaling means 22 includes a lever 48 pivotally mounted on the supporting frame by a pivot pin or shaft 50. One offset lug 48*a* on the lever 48 bears against one end of the lever 20, and another offset lug 48*b* bears against one end of a plunger or piston 52 that is slidably mounted on a portion 54 of the supporting frame. The other end of the plunger 52 engages one of a pair of contact springs 56 and 58.

In the normal position of the signaling assembly 22 shown in FIGS. 1–3, the tendency of the spring 56 to remain in the position shown in these figures provides a force component that is transmitted through the plunger 52 and the lever 48 to hold the lever 20 in its normal position. However, when the sensing means 18 moves downwardly following the engagement of the feeler 30 with a deformation in the record card, the lever 20 is pivoted in a clockwise direction about the pivot pin 46 so that the lever 48 is pivoted in a counterclockwise direction about the pivot pin 50. This movement of the lever 48 displaces the plunger 52 to the left from the position shown in FIG. 3 to the position shown in FIG. 4. The plunger 52 deflects the contact spring 56 into engagement with the contact spring 58 and provides an electrical signal to the associated time recorder indicating that the record card 12 is in a recording position. When the record card 12 is withdrawn from the time recorder, the contact spring 56 and the tension springs 32 and 40 restore the card locating means 10 to the position shown in the FIG. 1.

In operation, the time recorder provides the record card 12 with a deformation, such as the opening 12, that is used to index or position this card in a correct location to receive a data entry spaced from a preceding entry. When the card is inserted into the card receiving throat or guideway in the time recorder, the leading edge of the card slides over the upper surface of the plate 24 and into engagement with the curved portion 16*a* of the card lever 16. This pivots the lever 16 in a counterclockwise direction about the pivot pin 38 and against the resilient action of the tension spring 40. This movement of the lever 16 displaces the stud 36 to the left from the position shown in FIG. 1 to the position shown in FIG 2 so that the tension spring 32 pivots the arm 26 in the sensing means 18 in a clockwise direction about the pivot pin 28. During this movement, the offset ends of the resilient feelers or sensing elements 30 are biased into engagement with the outer surface of the record card 12 and are conditioned to detect or engage the locating deformation.

During continuing downward movement of the card 12, the lowermost opening 14 in this card moves into alignment with the free ends of the feelers 30 so that the end of at least one of these feelers drops into the opening and couples the sensing means 18 to the moving card 12. Further, downward movement of the card 12, shifts the sensing means 18 from the position shown in FIG. 3 to the position shown in FIG. 4 so that the lever 20 is pivoted in a clockwise direction about the pivot pin 46 and against the resilient force of the contact spring 56. This clockwise movement of the lever 20 continues until such time as the angular portion 20*a* thereon engages and clamps the card 12 against the plate 24. During this clockwise movement of the lever 20, the lever 48 is pivoted in a counterclockwise direction to force the plunger 52 to the left so that the contact spring 56 is shifted into engagement with the contact spring 58. This provides an electrical signal that indicates to the time recorder that the record card 12 is in a correct position for a recording operation. A data entry is now recorded on the card.

When the record card 12 is withdrawn by displacing this card upwardly, the lever 20 is pivoted in a counterclockwise direction so that the springs 56 and 58 separate and the lever 48 is restored to the normal position shown in FIGS. 1–3. When the trailing edge of the upwardly moving card passes beyond the curved portion 16a of the card sensing lever 16, this lever is displaced in a counterclockwise direction by the tension spring 40, and the stud 36 bears against an edge of the arm 26. Thus, during the final portion of the counterclockwise movement of the lever 16, the stud 36 pivots the arm 26 in a counterclockwise direction against the action of the tension spring 32 so that the feelers 30 are lifted out of engagement with the card 12. The card locating means 10 is now restored to the normal position shown in FIG. 1.

Since the feelers 30 do not arrest movement of the card 12 by passing through the aligned one of the openings 14, but merely provide means for coupling the sensing means 18 to the card 12 for movement in a direction generally parallel therewith, the openings 14 can be of a relatively small diameter, such as 1 millimeter. Locating openings of this size do not adversely affect the available storage area on the card 12 and do not prevent the use of the card in conventional punched card equipment.

Figure 6:
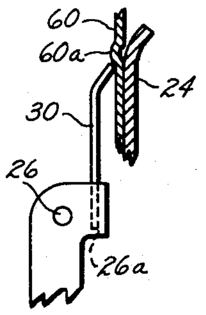
FIG. 6 is a fragmentary sectional view illustrating the use of the card locating means with a record element having a projecting portion formed therein.

The card locating means 10 can also be used with an imperforate record card in which the deformation used to control the operation of the locating means 10 comprises a projection or a depression in the card. FIG. 6 of the drawings illustrates a record card 60 in which the locating deformation comprises an elevated portion 60a. When the record card 60 is inserted into the time recorder, the card sensing lever 16 is deflected in the manner described above so that the feelers 30 are biased into engagement with the upper surface of this card. During continuing downward movement of the card 60, the offset ends of the feeler or feelers 30 engage the projection 60a to couple the sensing means 18 to this card. The card 60 now moves the sensing means 18 downwardly to actuate the lever 20 to its operated position in which the card 60 is clamped between the angular portion 20a on the lever 20 and the plate 24. The card 60 could similarly be formed with a depression, the trailing edge of which is engaged by the offset end of the feeler 30 to couple the sensing means 18 to the card.

Although the present invention has been described with reference to a single embodiment thereof, numerous other modifications and embodiments can be devised by those skilled in the art that will fall within the spirit and scope of the principles of this invention.

What is claimed and desired to be secured by Letters Patent of the United States is:

1. An arresting apparatus for use with a record element having a locating deformation in one planar surface thereof, which apparatus comprises sensing means for engaging said surface during movement of said record element, means mounting said sensing means for generally rectilinear movement by said record element in a direction generally parallel to said record element when said sensing means engages said locating deformation, and means controlled by said sensing means and actuated by said parallel movement of said sensing means for arresting movement of said record element.

2. A locating apparatus for use with a record card having a locating deformation therein comprising a movably mounted card engaging lever including an end portion disposed adjacent said card, sensing means movably mounted on the end portion of said lever, and resilient means for biasing said sensing means into engagement with a surface of said card so that said sensing means engages said locating deformation, the engagement of the deformation on a moving card by said sensing means causing movement of said lever into engagement with said card to arrest movement thereof.

3. A locating apparatus for use with a generally uniplanar record element having a locating deformation in a planar surface thereof comprising a record element engaging lever, first pivot means on which the lever is mounted for pivotal movement, second pivot means carried on the lever spaced from the first pivot means, sensing means pivotally mounted on the second pivot means, and resilient means biasing the sensing means into engagement with the record element, engagement of the sensing means by a deformation on a moving record element causing a corresponding movement of the sensing means in a direction generally parallel to the moving record element and movement of the sensing means causing a pivotal movement of the lever about the first pivot means so that the lever engages the record element to arrest movement thereof.

4. A locating apparatus for use with a generally uniplanar record element having a locating deformation in a planar surface thereof comprising a record element engaging lever having a record element engaging portion, first pivot means spaced from the record element engaging portion for pivotally mounting the lever, second pivot means spaced from the first pivot means and disposed adjacent the record element engaging portion, and record element sensing means biased toward engagement with the record element and pivotally mounted on the second pivot means, said record element sensing means including a portion extending forwardly from the second pivot means in a position generally parallel to the record element.

5. A card locating apparatus for use with a generally uniplanar card having a locating deformation comprising a card guideway, card engaging means movable toward and away from the guideway to arrest movement of a card along the guideway, a structure pivotally mounting said engaging means for movement toward and away from the guideway, card sensing means including an elongated portion extending generally parallel to the guideway, and pivot means pivotally mounting the card sensing means on the card engaging means at a point thereon between the structure and the guideway so that engagement of the card sensing means with the locating deformation moves the card sensing means in a direction generally parallel to the guideway to pivot the card engaging member into engagement with the card.

6. The card locating apparatus set forth in claim 5 in which said elongated portion includes a card engaging portion adjacent its outer end spaced forwardly from the pivot means.

7. The card locating apparatus set forth in claim 6 including resilient means connected to the card sensing means on the opposite side of the pivot means from the card engaging portion for biasing the card engaging portion toward the guideway.

References Cited in the file of this patent

UNITED STATES PATENTS

| | | |
|---|---|---|
| 1,629,078 | Kiely | May 17, 1927 |
| 2,084,098 | Long | June 15, 1937 |

FOREIGN PATENTS

| | | |
|---|---|---|
| 739,005 | Great Britain | Oct. 26, 1955 |